United States Patent
Cornelissen et al.

(10) Patent No.: US 8,371,436 B2
(45) Date of Patent: Feb. 12, 2013

(54) CONVEYOR PROVIDED WITH SIDE GUARD, AND SIDE GUARD ELEMENT

(75) Inventors: Leonardus Adrianus Catharinus Cornelissen, 's-Gravenhage (NL); Ronald Sigmond, Schiedam (NL)

(73) Assignee: Rexnord Flattop Europe B.V., 'S-Gravenzande (NL)

(*) Notice: Subject to any disclaimer, the term of this patent is extended or adjusted under 35 U.S.C. 154(b) by 228 days.

(21) Appl. No.: 12/863,783

(22) PCT Filed: Jan. 19, 2009

(86) PCT No.: PCT/NL2009/050021
§ 371 (c)(1),
(2), (4) Date: Sep. 21, 2010

(87) PCT Pub. No.: WO2009/093897
PCT Pub. Date: Jul. 30, 2009

(65) Prior Publication Data
US 2011/0000767 A1 Jan. 6, 2011

(30) Foreign Application Priority Data
Jan. 21, 2008 (NL) .................................... 2001205

(51) Int. Cl.
*B65G 17/06* (2006.01)
(52) U.S. Cl. ........................................ 198/853; 198/850
(58) Field of Classification Search ............... 198/850, 198/851, 853, 778
See application file for complete search history.

(56) References Cited

U.S. PATENT DOCUMENTS

| 5,137,144 A | * | 8/1992 | Uehara | 198/822 |
| 6,695,128 B2 | * | 2/2004 | Palmaer et al. | 198/778 |
| 6,766,901 B2 | * | 7/2004 | Guldenfels et al. | 198/837 |
| 6,811,021 B1 | * | 11/2004 | Corley | 198/690.2 |
| 6,840,371 B2 | * | 1/2005 | Hansen et al. | 198/850 |
| 7,500,555 B1 | * | 3/2009 | Liao | 198/844.1 |
| 7,556,145 B2 | * | 7/2009 | Elsner | 198/850 |
| 2003/0015406 A1 | * | 1/2003 | Guldenfels et al. | 198/837 |
| 2004/0011627 A1 | | 1/2004 | Palmaer et al. | |

FOREIGN PATENT DOCUMENTS

| EP | 0019028 A | 11/1980 |
| EP | 0113909 A | 7/1984 |
| EP | 0175483 A | 3/1996 |
| GB | 1367156 A | 9/1974 |
| WO | WO2006/127055 A | 11/2006 |

OTHER PUBLICATIONS

International Search Report for PCT/NL2009/050021.

* cited by examiner

*Primary Examiner* — Gene Crawford
*Assistant Examiner* — Keith R Campbell
(74) *Attorney, Agent, or Firm* — Quarles & Brady LLP

(57) ABSTRACT

A conveyor having a conveying face includes a side guard. The side guard is formed with a series of wall parts extending in a conveying direction and upstanding transversely to the conveying direction. At least two wall parts of the series of wall parts overlap in the conveying direction at least partly at a top side of the at least two wall parts remote from the conveying face.

30 Claims, 9 Drawing Sheets

CONVEYOR PROVIDED WITH SIDE GUARD, AND SIDE GUARD ELEMENT

CROSS-REFERENCE TO RELATED APPLICATIONS

This application is the National Stage of International Application No. PCT/NL2009/050021, filed Jan. 19, 2009, which claims priority to Netherlands Application No. 2001205, filed Jan. 21, 2008. The contents of these applications are hereby incorporated by reference in their entireties.

TECHNICAL FIELD

The invention relates to a conveyor, comprising a conveying face with a side guard which is formed with a series of wall parts extending in conveying direction and upstanding substantially transversely to the conveying face, wherein in each case at least two wall parts overlap in conveying direction at least partly in a fan-like manner at a top side remote from the conveying face.

BACKGROUND

Such a conveyor with side guard is generally known. The side guard is used to prevent products from leaving the conveying face in transverse direction. What is achieved by providing the conveying face with a side guard is that it moves along with the conveyor. Thus, in relation to a stationarily disposed side guard, less relative movement occurs with regard to the products to be conveyed, which reduces the risk of damage to and loss of products. The upstanding wall parts are often designed as plate-shaped elements. When the conveyor is designed as a modular conveyor mat, the plate-shaped elements are typically provided with hinge loops which cooperate with the hinge pins of the conveyor mat. Such wall parts are known to the skilled person under the name "side guards". The known side guards are formed by a series of wall parts which are identical at least at their top sides, in particular by a series of identical wall parts spaced apart at regular interspaces in conveying direction, arranged at an equal distance and orientation with respect to a side edge of the conveyor.

SUMMARY

Side guards on the conveying face are often used in combination with transverse partitions, also called "flights", extending between two side guards, whereby free movement of the products to be conveyed in the conveying direction can be hindered. What can be achieved with the aid of a combination of side guard and flights is that the products to be conveyed can remain lying on the conveying face when the conveyor bridges a height difference.

When bridging a height difference, the conveying face of the conveyor sometimes traverses an upward bend about an axis of rotation transversely to the conveying direction. This movement is indicated by the skilled person with the term "back flexing". Further, the conveying face of the conveyor sometimes traverses a downward bend about an axis of rotation at right angles to the conveying direction. This movement is indicated by the skilled person as "sprocket flexing". When the products to be conveyed are for instance moved upward by a conveyor to be poured, the conveyor often performs a back flexing movement at the transition from a flat track part to an upward inclining track part of the track guide. When pouring the products, the conveyor often performs a sprocket flexing movement in that, at the end of an upward inclining track part, the conveyor merges to a substantially flat track part of the track guide or is returned about a returning wheel.

When back flexing, wall parts successive in conveying direction must be able to overlap to thus enable the upward bend by sliding together. Conversely, when sprocket flexing, the successive wall parts have to overlap to a lesser extent to allow for the downward bend. However, it is desired here to maintain some overlap of the wall parts so that formation of openings which reduce the side guard function can be prevented. In particular when the side guard elements are to have a relatively great height transversely to the conveying face, it has proven difficult to combine these two requirements. Further, a large number of other requirements are imposed on the side guard, such as cleanability, reliability and safety. Therefore, the known conveyors with side guards cannot both back flex well and maintain the side guard function upon sprocket flexing. Further, they are insufficiently cleanable, are unreliable and unsafe.

The object of the invention is to provide a conveyor with side guard in which the drawbacks mentioned are obviated. To that end, the invention provides a conveyor, comprising a conveying face with a side guard formed with a series of wall parts extending in conveying direction and upstanding substantially transversely to the conveying face, while in each case at least two wall parts overlap in conveying direction at least partly in a fan-like manner at a top side remote from the conveying face, and wherein wall parts in the series mutually differ at least at their top sides.

By forming the series with wall parts which mutually differ at least at their top sides, the back flexing and sprocket flexing properties of the side guard can be improved. Having the wall parts in the series differ at least at their top sides as regards orientation and/or distance with respect to a longitudinal edge of the conveyor allows for more space between successive wall parts for back flexing, or for the overlap to be maintained in conveying direction upon sprocket flexing. As an alternative or in addition thereto, wall parts in the series can mutually differ at least at their top sides in shape and/or size. Therefore, the wall parts can be of different types. In an elegant manner, the wall parts in the series successive in conveying direction mutually differ at least at their top sides.

By providing a side guard with which, in each case, at least two wall parts are arranged, overlapping at least at their top sides while including a slot-shaped interspace which corresponds to the thickness of at least one top side of a wall part, upon back flexing, the wall parts can overlap sufficiently to maintain their overlap well when sprocket flexing, while, upon back flexing, the wall parts can still slide together further. Here, at least adjacent an end, the walls can have at least one side face extending parallel to a side edge of the conveyor.

By providing each of the upstanding wall parts, viewed in conveying direction, with two ends which are connected via a substantially obliquely extending connecting piece, a geometry is achieved which is particularly advantageous both for back flexing and sprocket flexing, while further a particularly reliable and safe side guard is realized. By providing each of the upstanding wall parts with two ends that are interconnected via a substantially multi-stage designed connecting piece, a relatively large distance can be bridged while maintaining a good guiding function transversely to the conveying direction, so that between the upstanding wall parts yet more space is present whereby back flexing can be simplified. Advantageously here, the slot-shaped interspace is configured such that one or more other wall parts from the series can be at least partly accommodated therein or even have been accommodated therein. As a result, the back flexing properties can be improved further, and even when the two successive wall parts lose their overlap when back flexing, a wall part can be present with limited intermediate distance transversely to the conveying direction, which guarantees the side guard function.

Optionally, the wall parts can each form part of a subseries of wall parts, with the subseries together forming a side guard of multiple design. What can be achieved with the aid of such a multiple design side guard is that when two wall parts from one subseries, successive in conveying direction lose their overlap when back flexing, transversely to the conveying direction, in another subseries, a wall part can be present with limited intermediate distance, which guarantees the side guard function. It is noted that a conveyor, comprising a conveying face with a side guard formed with a multiple number of subseries of wall parts extending in conveying direction and upstanding substantially transversely to the conveying direction, with in each case at least two wall parts in one series overlapping in conveying direction at least partly in a fan-like manner at a side remote from the conveying face, can also be considered an invention.

Optionally, the conveyor can comprise a number of modules successive in conveying direction, which are each provided with a body part extending transversely to the conveying direction having hinge loops reaching forward and rearward in conveying direction, while hinge loops of successive modules cooperate and are coupled with the aid of hinge pins. Such a type of conveyor is known to the skilled person and is indicated with the term modular conveyor mat. Owing to its modular design, such a modular conveyor mat is particularly suitable for including side guard elements at particular locations with which a side guard can be formed. With modular conveyor mats, one or more modules may be provided transversely to the conveying direction. Further, successive modules can mutually correspond in conveying direction or be provided in a brick pattern, staggered relative to each other. A modular conveyor mat can further be built up from mat modules of different sizes and different types such as for instance so-called end modules to be included at the edge of the conveyor mat with which the hinge pins can be confined transversely to the conveying direction, and so-called center modules which have a relatively large size transversely to the conveying direction.

With a modular conveyor mat, the pitch of successive wall parts can be chosen to be smaller than the pitch of successive modules. What can be achieved in this manner is that the extent of overlap of wall parts successive in conveying direction can be increased relatively easily. The pitch of the wall parts can also be chosen to be greater or equal to the pitch of the modules.

When, with a modular conveyor mat, the interspace in conveying direction has the largest slot-width adjacent a center of a body part, the widest slot can be as far removed as possible from the location where successive modules hinge relative to each other. Thus, upon sprocket flexing, the side guard function can be maintained better.

When the side face is located in conveying direction adjacent a center of a body part, a good connection can be realized with a flight extending transversely to the conveying direction. Preferably, the side face continues to adjacent an underside of the wall part.

By providing the conveying face, adjacent a center of a body part at least at the location of an area located under the interspace, with a recess, the side guard faces can be made easily cleanable. Preferably, the recess transversely to the conveying direction is continued as a free space surrounded by the wall parts. Such a recess can increase the manufacture of the mat module and the safety.

What can be achieved by forming the overlapping wall parts integrally with a common carrier, is that the overlapping wall parts have a highly stable positioning. This is beneficial to the reliability and the safety of the side guard. Connecting the wall parts to the carrier via a joint base provides the wall parts with a relatively robust, stable base. Here, the above-mentioned recess in the module then preferably continues as a free space surrounded by the base.

By providing the common carrier with one or more hinge loops, the wall parts can be included relatively easily in a modular conveyor mat. Optionally, the common carrier can form part of a mat module. It is also possible to secure a common carrier without hinge loops, on the conveying surface of, for instance, a module. By providing at least a number of modules with at least two wall parts, a reliable and safe side guard can be realized in an elegant manner.

The invention also relates to a side guard element for a conveyor mat, comprising a common carrier with a conveying face which is provided with at least two upstanding wall parts which overlap at least partly in fan-like manner at a top side remote from the conveying face while including a slot-shaped interspace which corresponds to the thickness of at least a top side of a wall part. Here, the wall parts may have a common base, and/or the common carrier can be provided with one or more hinge loops. The side guard elements can optionally form part of a module for a modular conveyor mat. At least adjacent one end, with one side face, the overlapping wall parts can run substantially parallel to a side edge of the module.

The invention further relates to a conveyor, comprising a conveying face with a side guard which is formed with a series of wall parts extending substantially in a conveying direction and upstanding substantially transversely to the conveying face, wherein in each case, at least two wall parts overlap in conveying direction at least partly in a fan-like manner at a top side remote from the conveying face, are arranged while including an interspace having a thickness which corresponds to at least a top side of a wall part, and proceed, at least adjacent an end, with at least one side face substantially parallel to a side edge of the conveyor. What is achieved by having wall parts proceed at least adjacent an end with at least one side face substantially parallel to a side edge of the conveyor, is that the wall parts can overlap when back flexing to a sufficient extent to well maintain their overlap when sprocket flexing, while, upon back flexing, the wall parts can still sufficiently slide in further.

Further advantageous embodiments of the invention are represented in the subclaims.

It is noted that within this context, in each case, the condition of the conveyor is described in a flat plane, unless it is mentioned that the conveyor is in a back flexing or sprocket flexing position. Therefore, the overlapping of the wall parts described in claim 1 for instance, concerns a condition of the conveyor in a flat plane.

The invention will be elucidated on the basis of an exemplary embodiment which is represented in the drawings.

DETAILED DESCRIPTION

Figure 1A:
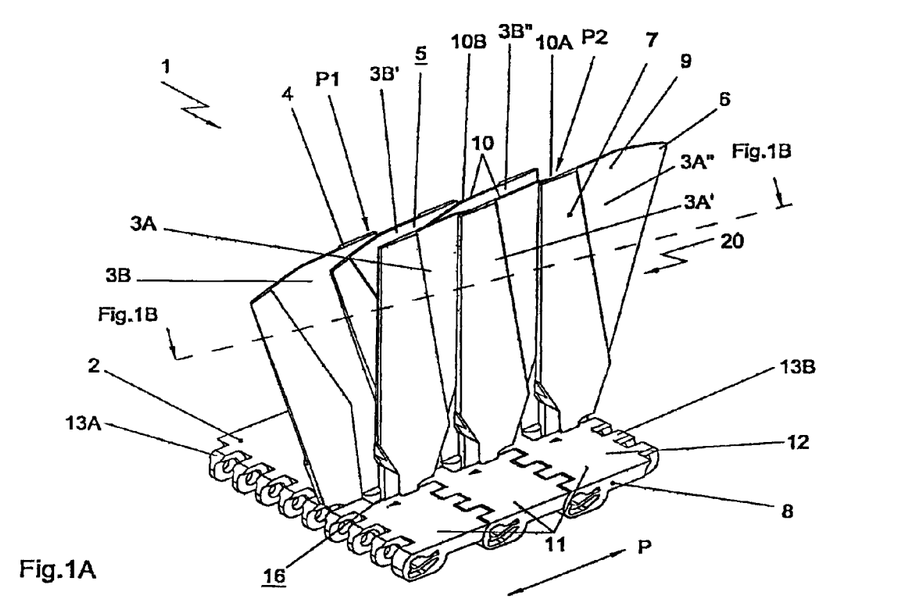
FIG. 1A shows a schematic, perspective view of a part of a conveyor with side guard which is in flat plane.
Figure 1B:
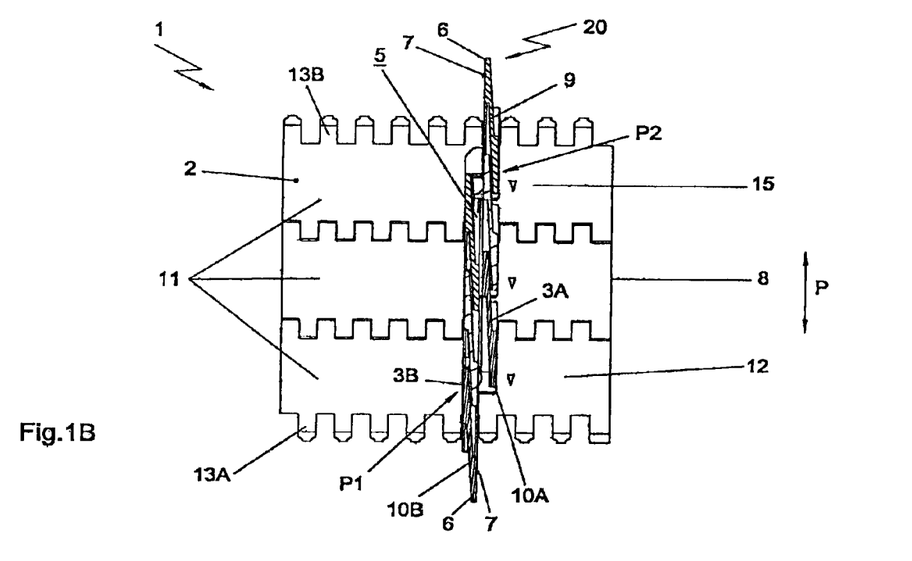
FIG. 1B shows a schematic top plan view of the conveyor of FIG. 1A, with a cross section along the line 1B-1B of FIG. 1A.

FIG. 1 shows a conveyor 1, comprising a conveying face 2 with a side guard 20. The conveyor can be a modular conveyor mat, as represented here, but can also for instance be a non-modularly designed conveyor belt. In FIG. 1, it is shown that the conveyor 1 is in a flat plane, as is the case when traversing a flat track part of a conveying path. In FIG. 1, only a part of the conveyor 1 is represented. The conveyor 1 is typically of endless design, while an upper part of the conveyor is carried, with the aid of drive wheels, along a conveying track, is returned via returning wheels and is guided back via a return guide. In this exemplary embodiment, the conveyor 1 is designed as a modular conveyor mat and comprises a number of modules 11 successive in conveying direction P. The modules 11 are each provided with a body part 12 extending transversely to the conveying direction P, with hinge loops 13A reaching forward in conveying direction and with hinge loops 13B reaching rearward in conveying direction. The hinge loops 13A, 13B of successive modules 11 cooperate and are coupled with the aid of hinge pins 14 not represented in the Figure.

In the exemplary embodiment, only one side guard 20 is represented. Usually, the conveyor 1 is provided on both long side edges 8 with a side guard 20 so that the two side guards 20 are spaced apart at a considerable intermediate distance and the largest part of the conveying face is situated between the side guards 20. As already explained in the introduction to the specification, transversely to the conveying direction P, optionally, flights may be provided (not represented in the Figure).

In FIG. 1, only one row of modules 11 is represented. It will be clear that a modular conveyor mat can be built up from several modules 11 transversely to the conveyor direction, for instance a series of modules without wall parts 3 which, transversely to the conveying direction P, is enclosed on the side edges 8 of the mat by edge modules with one or more wall parts 3A, 3B. The side guard 20 is formed having a series 10 of wall parts 3 upstanding substantially transversely to the conveying face and extending in conveying direction, indicated with double arrow P. In the series 10, as indicated for instance at arrows P1 and P2, in each case, two wall parts 3 overlap in conveying direction P at least partly in a fan-like manner at a top side 4 remote from the conveying face 2. Wall parts 3 in the series 10 mutually differ at least at their top sides 4. Wall parts 3 in the series 10 successive in conveying direction P mutually differ at their tops 4 in their distance with respect to a longitudinal edge 8 of the conveyor 1. These overlapping wall parts 3 are provided while including a slot-shaped interspace 5 with a thickness which corresponds to at least one top side 4 of a wall part 3.

In this exemplary embodiment, the wall parts 3 overlapping with a slot-shaped interspace 5 are not successive in conveying direction P but in each case separated by a further wall part. Optionally, as will be elucidated further on the basis of FIG. 5, the, in each case, two wall parts 3 overlapping at the top side 4 at least partly in a fan-like manner, and including a slot-shaped interspace 5, can also be successive in conveying direction P. The slot width of the interspace 5 corresponds to the thickness of at least a top side 4 of the wall part 3. Adjacent at least one end 6, the overlapping wall parts 3 proceed with at least one side face 7 substantially parallel to a side edge 8 of the conveyor 1.

Viewed in conveying direction P, the overlapping wall parts are each provided with two ends 6 which are connected via a substantially obliquely extending connecting piece 9. In the flat position shown in FIG. 1, one other wall part 3A' from the series 10 is at least partly accommodated in the slot-shaped interspace 5. Here, the overlapping wall parts 3A, 3B are arranged at different distances relative to the side edge 8 of the conveyor 1. The wall parts 3A,3B each form part of a subseries 10A, 10B of wall parts 3, while the subseries 10A, 10B form a side guard 20 of multiple design.

In this exemplary embodiment, in conveying direction P, the pitch of successive wall parts 3 is smaller than the pitch of successive modules 11. Here, adjacent the center 15 of the body part 12, in the conveying direction P, the interspace 5 has the largest slot width, and the side face 7 is located, in conveying direction P, adjacent the center 15 of the body part 12. Here, the conveying face 2 is provided, adjacent the center of the middle part 12, at least at the location of an area located under the interspace 5, with a recess 16. In this example, the recess continues transversely to the conveying face 2 as a free space surrounded by the wall parts 3A, 3B. The overlapping wall parts 3A, 3B are integrally formed with a common carrier, which, in this exemplary embodiment, is formed by the body part of a module 11. The wall parts 3A, 3B are connected to the carrier via a common base and the common carrier is provided with hinge loops 13. In the Figures, all modules 11 are provided with two wall parts 3A, 3B.

Referring to FIG. 4, in detail, a module 11 is shown from the conveyor 1 of FIG. 1. The module 11 shown is provided with at least two wall parts 3A, 3B. The module forms a side guard element for a conveyor mat 1, comprising a common carrier, in this case the body part 12 of the module 11', with a conveying face 2. The conveying face 2 is provided with two upstanding wall parts 3A, 3B, which overlap at least partly in a fan-like manner at a top side 4 remote from the conveying face 2, while including a slot-shaped interspace 5 which corresponds to the thickness of at least a top side 4 of the wall part 3. In this exemplary embodiment, the wall parts 3 proceed, at least adjacent an end 6, with at least one side face 7 substantially parallel to a side edge 8' of the module 11.

Figure 2A:
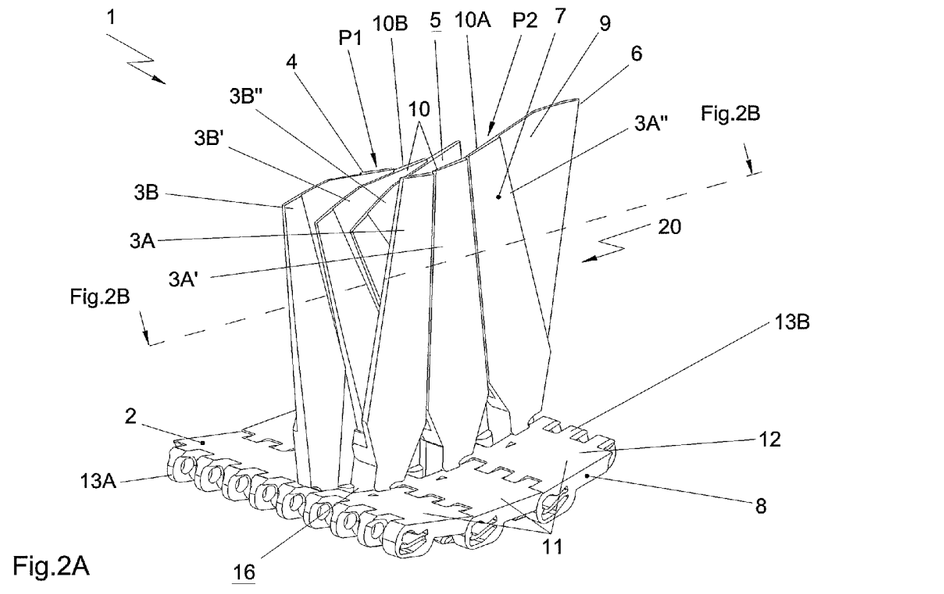
FIG. 2A shows a schematic perspective view of the conveyor of FIG. 1A when traversing an upward bend.
Figure 2B:
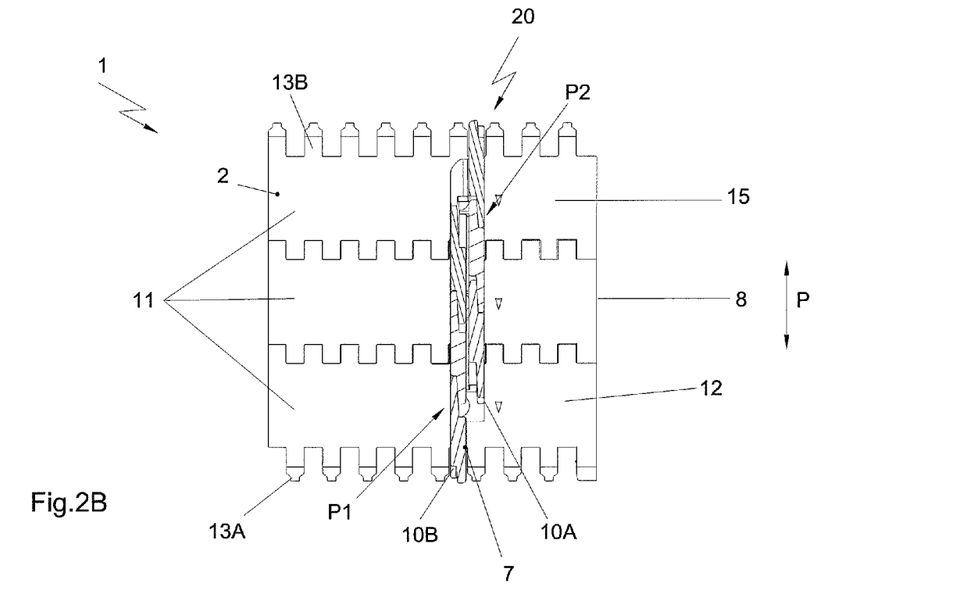
FIG. 2B shows a schematic top plan view of the conveyor of FIG. 2A, with a cross section along the line 2B-2B of FIG. 2A.

With reference to FIG. 2, it is represented that the conveying face 2 of the conveyor 1 traverses an upward bend about an axis of rotation A1 transversely to the conveying direction P. Here, the conveyor 1 performs a back flexing movement. As is represented in FIG. 2, the successive wall parts 3A, 3A', 3A", and 3B, 3B', 3B", respectively, in the subseries 10A, 10B overlap more than in FIG. 1, so that the upward bend is enabled through sliding together of the wall parts. As the side faces 7, running substantially parallel to the side edge 8 of the conveyor 1, have a relatively large slot-shaped interspace 5 adjacent the ends 6 of the overlapping wall parts 3A, 3B, a wall part 3A' successive in conveying direction P can be accommodated.

Figure 3A:
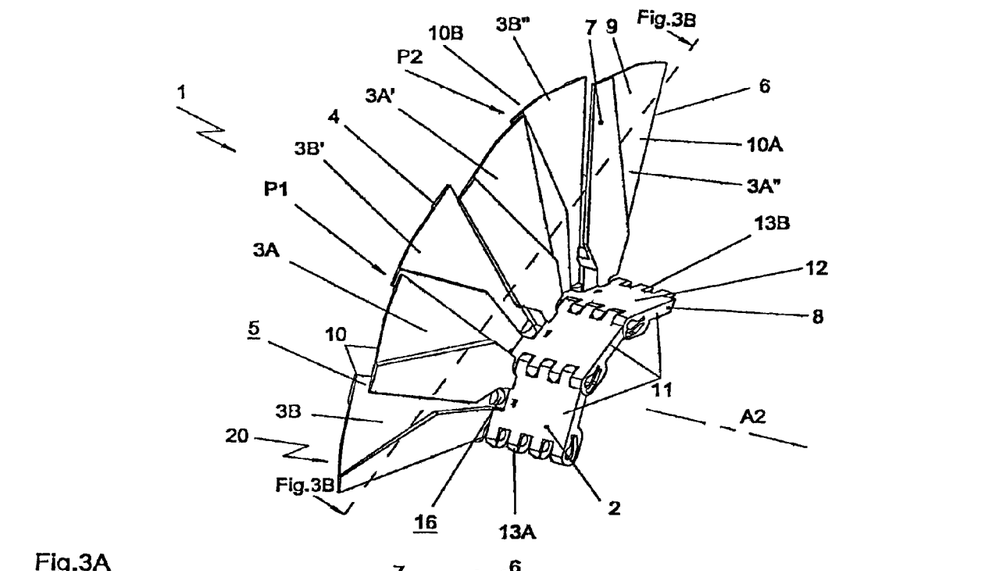
FIG. 3A shows a schematic, perspective view of the conveyor of FIG. 1A when traversing a downward bend.
Figure 3B:
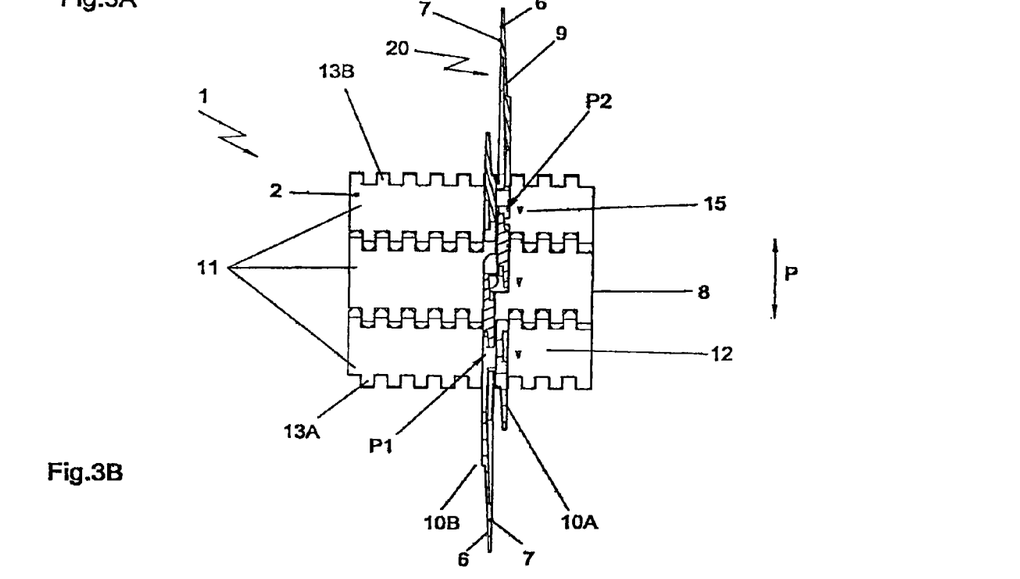
FIG. 3B shows a schematic top plan view of the conveyor of FIG. 3A, with a cross section along the line 3B-3B of FIG. 3A.
Figure 4A:
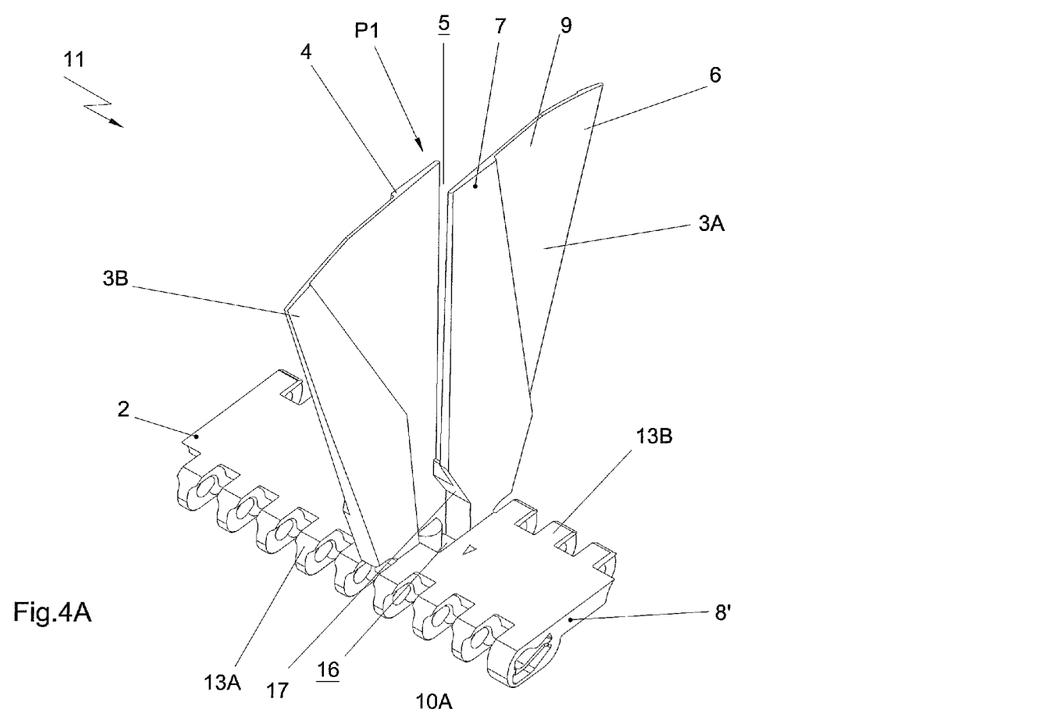
FIG. 4A shows a schematic perspective view of a module of the conveyor of FIG. 1A.
Figure 4B:
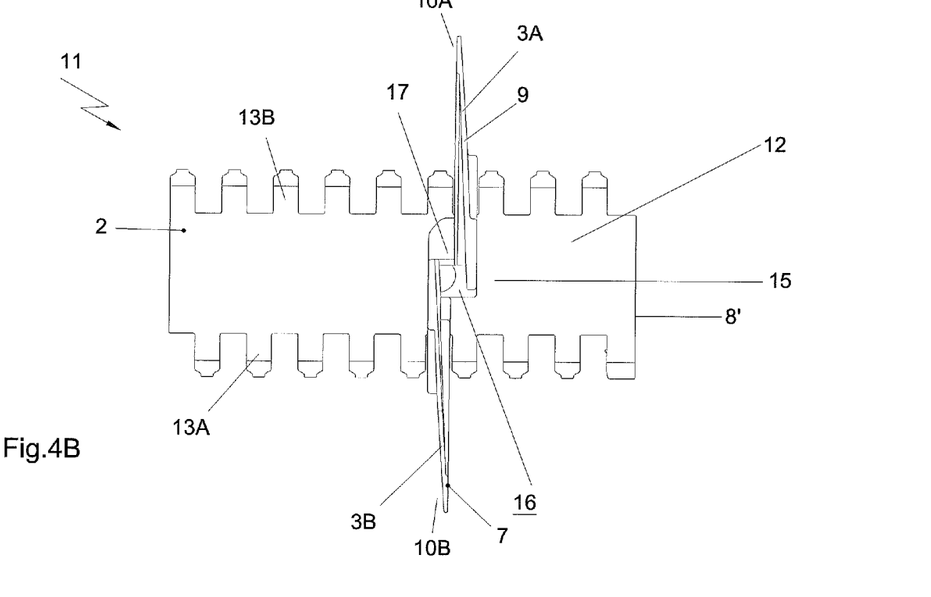
FIG. 4B shows a top plan view of the module of FIG. 4A.
Figure 4C:
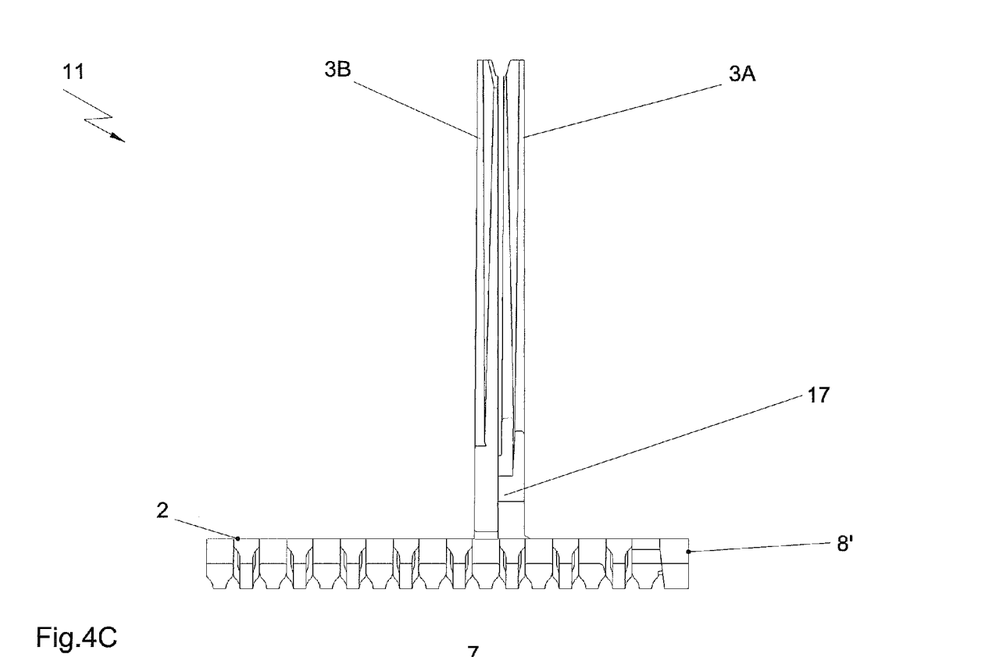
FIG. 4C shows a front view of the module of FIG. 4A.
Figure 4D:
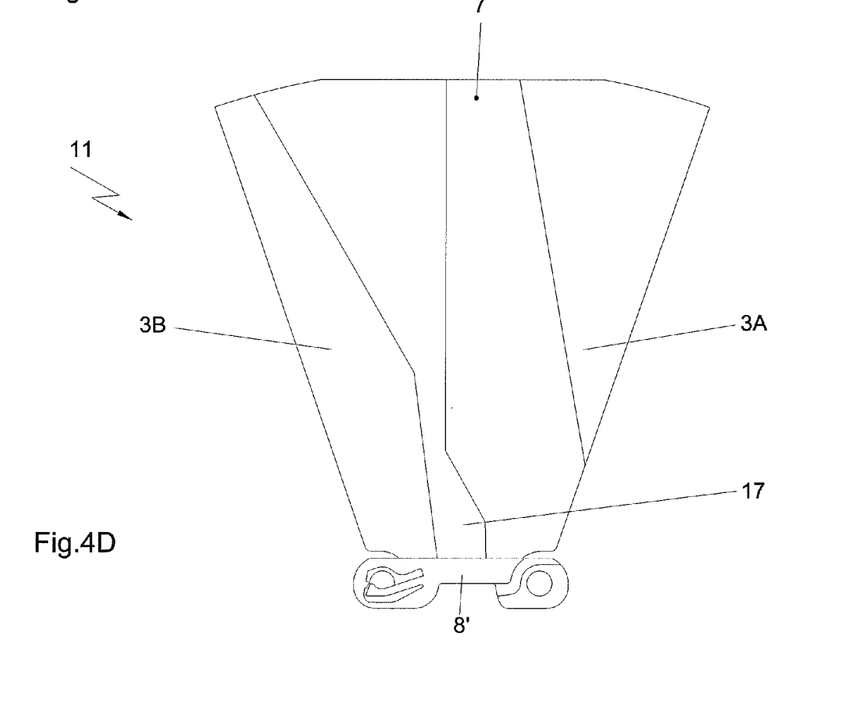
FIG. 4D shows a side view of the module of FIG. 4A.

In FIG. 3 it is shown that the conveying face 2 of the conveyor 1 traverses a downward bend about an axis of rotation A2 transversely to the conveying direction P. Here, the conveyor 1 performs a sprocket flexing movement. The wall parts 3A, 3A' successive in conveying direction overlap to a lesser extent than in the situation shown in FIG. 1. However, transversely to the conveying direction P, with a small intermediate distance, a wall part 3B is present which guarantees the side guard function.

In this exemplary embodiment, the wall parts 3 are each provided on both ends with one side face 7 which runs substantially parallel to the side edge 8 of the conveyor 1. This needs not always be the case. In another embodiment for instance, one or both ends 6 can be provided with two side faces 7 running parallel to the side edge, or even with faces not running parallel.

Figure 5A:
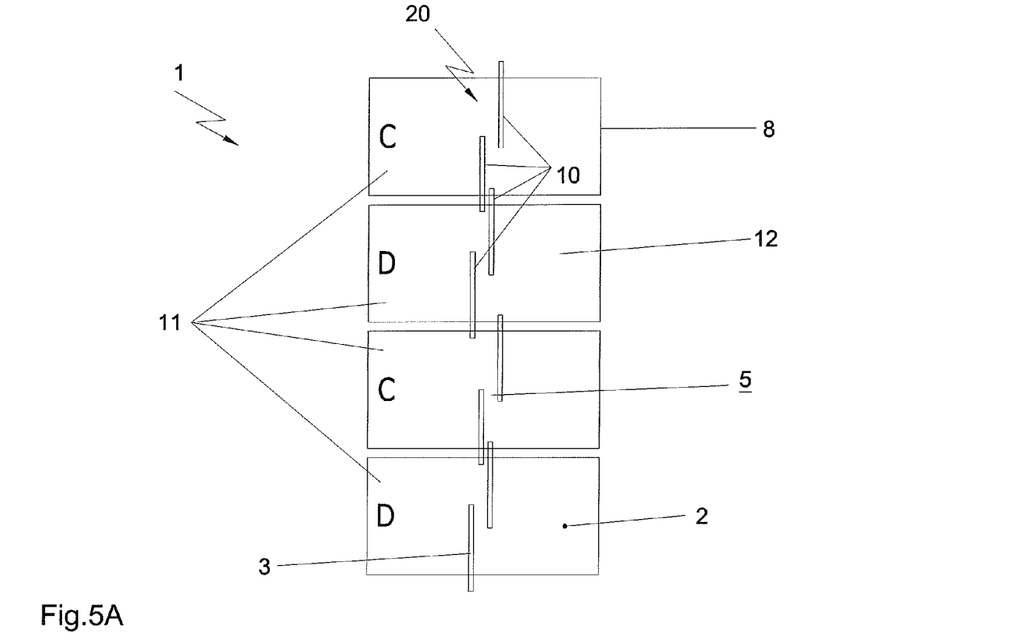
FIGS. 5A-5G schematically show, in top plan view, in each case an alternative embodiment of the conveyor with side guard. It is noted that the Figures merely serve as schematic representations of advantageous embodiments which are represented by way of non-limitative exemplary embodiment. In the Figures, identical or corresponding parts are represented with the same reference numeral.
Figure 5B:
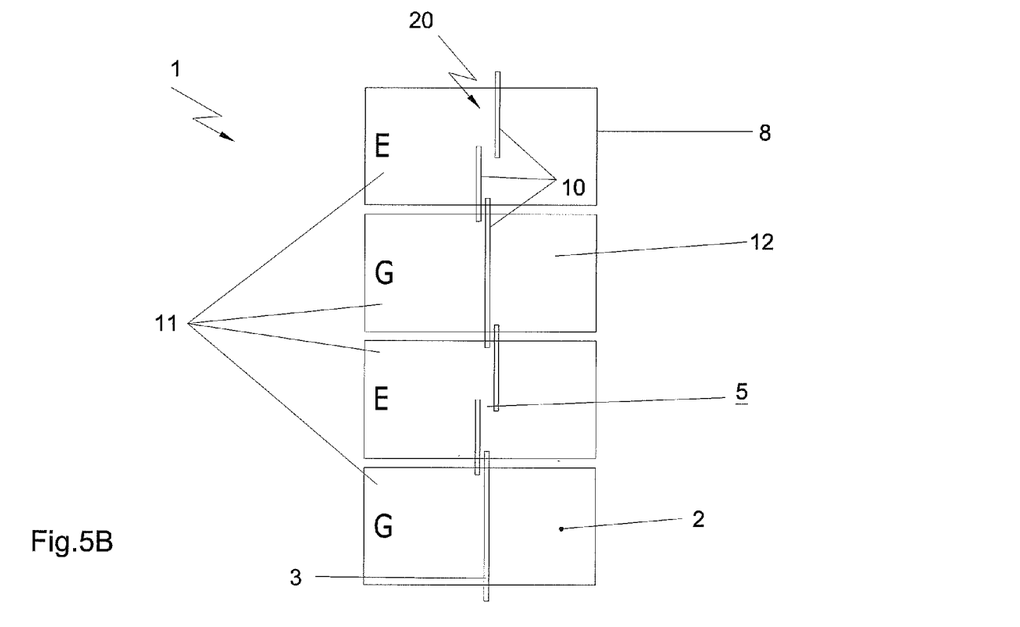
Figure 5C:
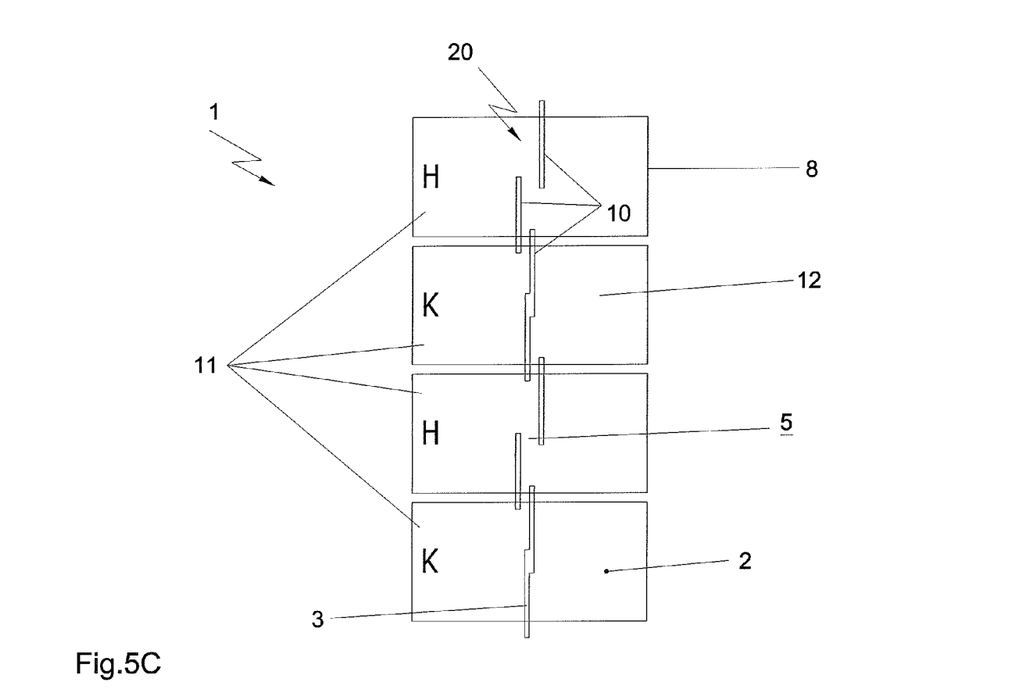
Figure 5D:
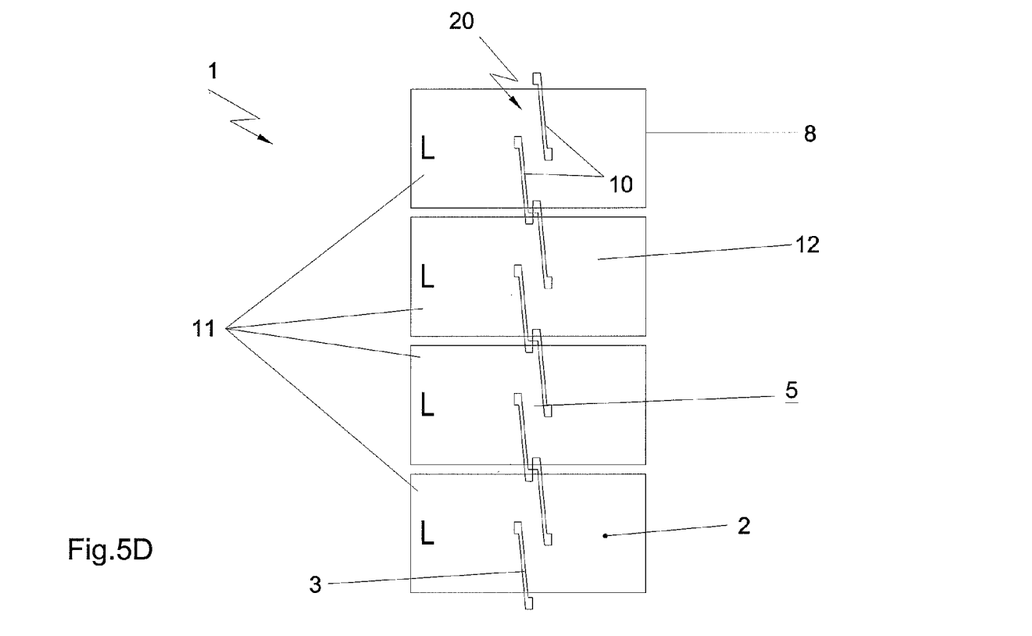
Figure 5E:
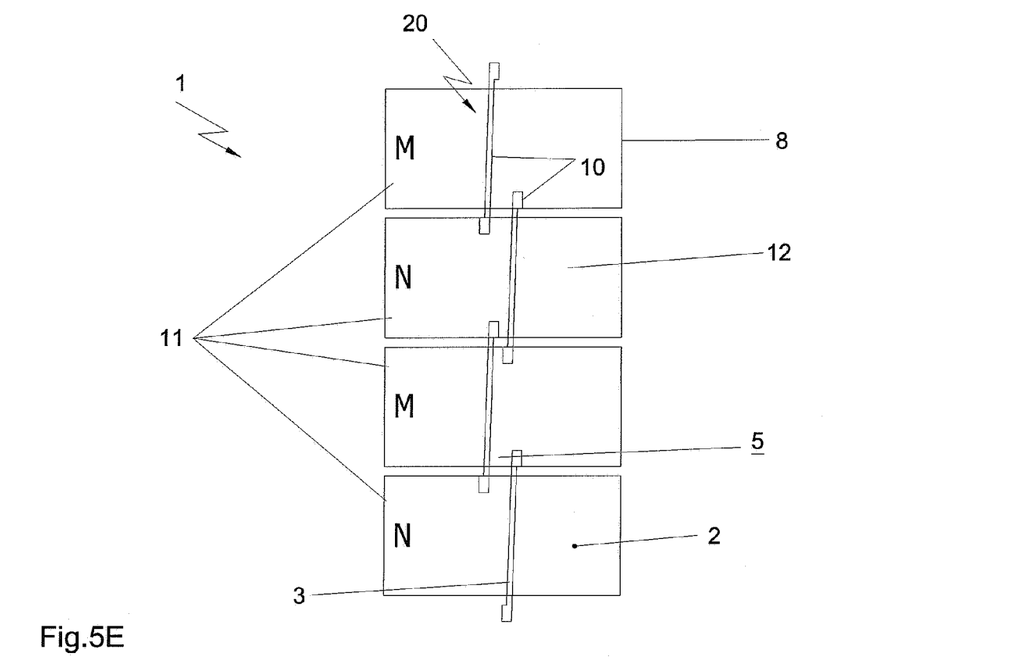
Figure 5F:
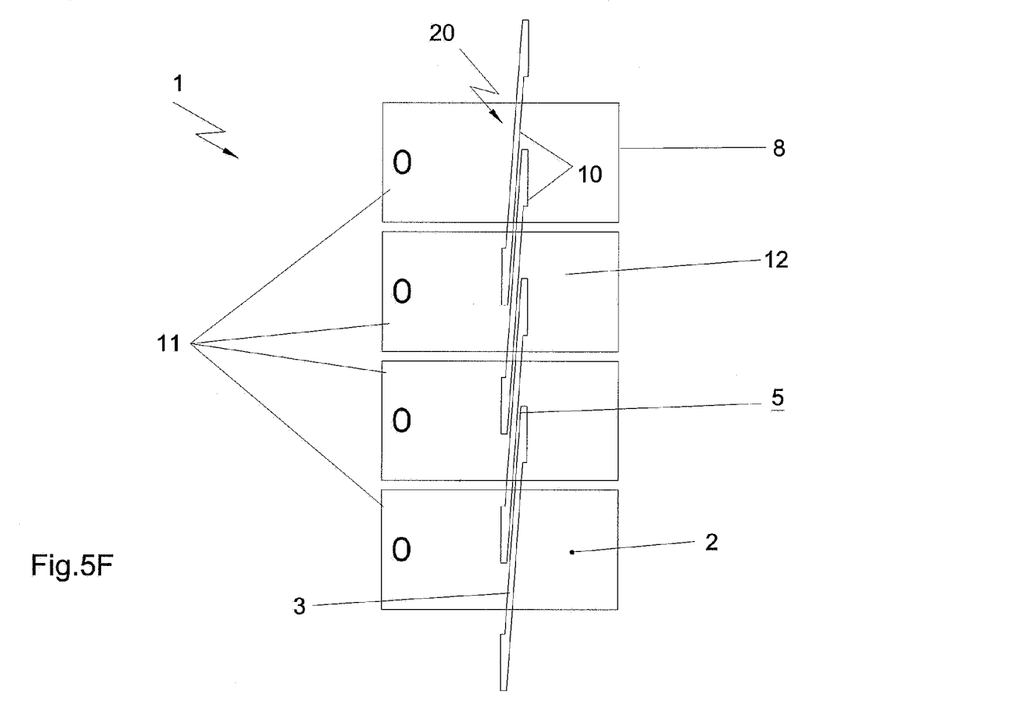
Figure 5G:
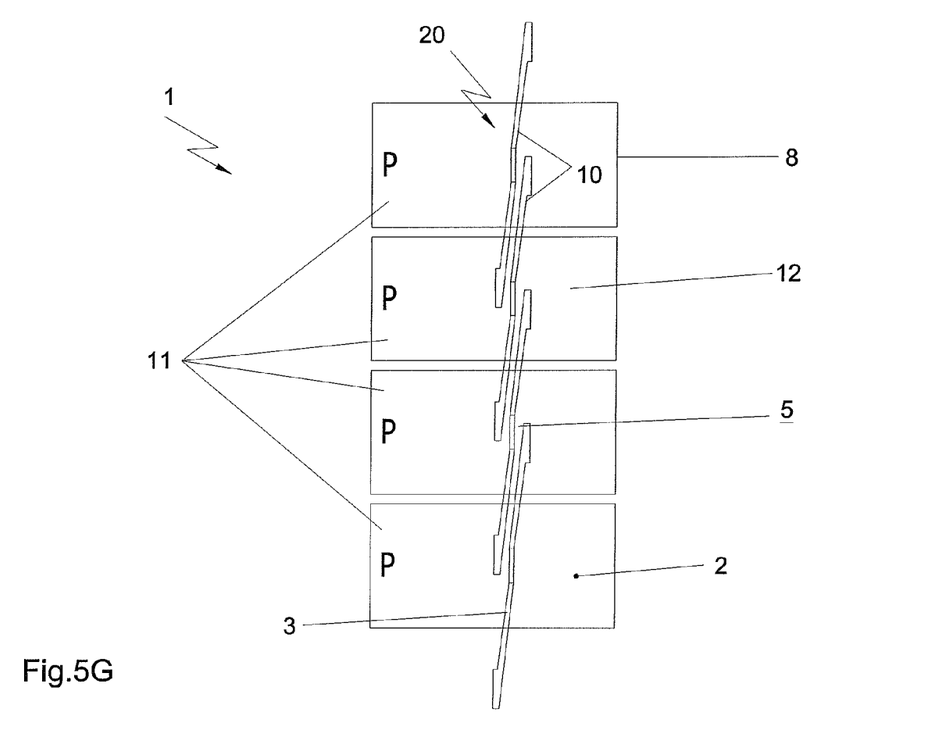

It is noted that the invention is not limited to the exemplary embodiment represented in FIGS. 1-4. Many variants are possible. For instance, wall parts in the series can mutually differ at least at their top sides in orientation and/or distance with respect to a longitudinal edge of the conveyor. Also, wall parts in the series can mutually differ at least at their top side in shape and/or size. In FIG. 5A for instance, a variant embodiment is represented where the side guard 20 is built up with the aid of two types of modules 11 which alternate in conveying direction P. Both types are provided with two wall parts 3 overlapping in conveying direction at least partly in a fan-like manner while including a slot-shaped interspace 5. Here, the wall parts 3 extend in their entirety substantially parallel to a side edge 8 of the conveyor 1, and are arranged each at a different distance with respect to the side edge 8 of the conveyor 1, while their orientation is the same. In this embodiment, the side guard 20 is built up with a number of parallel proceeding series of wall parts 3, while per row, in conveying direction, the wall parts 3 have an interspace which is greater than a wall part 3. In FIG. 5B, a variant is shown where one of the types of modules bears only one wall part 3. In FIG. 5C, a different variant is shown, where the wall parts 3 are connected via a part that is of stepped design. In FIG. 5D, schematically, the variant embodiment of FIGS. 1-4 is represented. With this variant one type of module 11 is provided, which is provided two obliquely arranged wall parts 3A. Here, the wall parts 3 are placed at different distances to the side edge 8. In FIG. 5E, an embodiment is shown where two types of modules 11 are provided, each bearing one wall part 3. The wall parts 3 of the different types are arranged at different distances to the side edge. In this embodiment, the wall parts are each provided with two ends 6 which are interconnected via a substantially obliquely extending connecting piece 9. At the ends 6, the wall parts 3 are each provided with a side face 7 running substantially along the longitudinal edge. In this embodiment, the side faces 7 are located in four parallel rows in conveying direction P. In FIG. 5F, an exemplary embodiment is shown where one type of module 11 is provided, while in each case, one wall part 3 is included in the same position and orientation with respect to the side edge 8. The wall part 3 is provided adjacent both ends 6 with a side face 7 which proceeds substantially parallel to a side edge of the conveyor. Wall parts successive in conveying direction overlap at least partly in a fan-like manner at a top side 4 remote from the conveying face 2 and include a slot-shaped interspace 5 which corresponds to the thickness of at least one top side of a wall part. In this embodiment, the slot-shaped interspace 5 is a few times the thickness of the top side 4 of a wall part 3. In the exemplary embodiment of FIG. 5F, the two ends are interconnected via a substantially obliquely extending connecting piece 9. In the embodiment of FIG. 5G, the ends are interconnected via a connecting piece of substantially stepped design. With the embodiments in FIGS. 5E, 5F and 5G, the pitch of the wall parts is equal to the pitch of the modules, and the largest slot width is located near a hinge loop of the module. It will be clear that the exemplary embodiments represented in FIG. 5 can also be applied with a non-modular conveyor.

These and other variants will be clear to the skilled person and are understood to fall within the scope of the invention as set forth in the following claims.

1. conveyor
2. conveying face
3A, 3B; 3A', 3B'; 3A", 3B" wall parts
4 top side wall parts
5. slot-shaped interspace
6. end wall part
7. side face
8. side edge mat
8'. side edge module
9. oblique connecting piece between ends
10A, 10B series of wall parts
11 modules
12 body part
13A, 13B hinge loops
14 hinge pin
15 center body part
16 recess
17 common base
20 side guard
double arrow P conveying direction
P1 exemplary location two overlapping wall parts
P2 further exemplary location two overlapping wall parts
A1 axis of rotation FIG. 2
A2 axis of rotation FIG. 3

The invention claimed is:

1. A conveyor comprising:
   a conveying face;
   a side guard formed with a series of wall parts extending in a conveying direction and upstanding substantially transversely to the conveying face, at least two wall parts of said series of wall parts overlapping in the conveying direction at least partly at a top side of said at least two wall parts remote from the conveying face, said at least two wall parts being arranged to include a slot-shaped interspace corresponding to a thickness of at least the top side of a wall part of said series of wall parts, wherein one or more other wall parts of said series of wall parts can at least partly be accommodated in the slot-shaped interspace.

2. The conveyor according to claim 1, wherein wall parts in the series are substantially identical at least at their top sides in orientation and/or distance with respect to a longitudinal edge of the conveyor.

3. The conveyor according to claim 1, wherein wall parts in the series are substantially identical at least at their top sides in form and/or size.

4. The conveyor according to claim 1, wherein wall parts in the series successive in conveying direction are substantially identical at their top sides.

5. The conveyor according to claim 1, wherein, adjacent an end, the overlapping wall parts have at least one side face extending substantially parallel to a side edge of the conveyor.

6. The conveyor according to claim 1, wherein said overlapping wall parts, viewed in conveying direction, are each provided with two ends which are connected via a substantially obliquely extending connecting piece.

7. The conveyor according to claim 1, wherein, viewed in conveying direction, said upstanding walls are each provided with two ends which are connected via a connecting piece of substantially stepped design.

8. The conveyor according to claim 1, wherein one or more other wall parts from the series are accommodated at least partly in the slot-shaped interspaces.

9. The conveyor according to claim 1 wherein said overlapping wall parts are arranged with different orientation and/or distance with respect to a side edge of the conveyor.

10. The conveyor according to claim 1, wherein the series is formed with different wall part shapes.

11. The conveyor according to claim 1, wherein said wall parts each form part of a subseries of wall parts, wherein the subseries jointly form a side guard.

12. The conveyor according to claim 1, comprising a number of modules successive in conveying direction, each provided with a body part extending transversely to the conveying direction having hinge loops reaching forward and rearward in conveying direction, wherein the hinge loops of successive modules cooperate and are coupled with the aid of hinge pins.

13. The conveyor according to claim 12, wherein in conveying direction the pitch of successive wall parts is smaller than the pitch of successive modules.

14. The conveyor according to claim 12, wherein, in conveying direction, said interspace has the largest slot-width adjacent a center of a body part.

15. The conveyor according to claim 12, wherein, in conveying direction, a side face is located adjacent a center of a body part.

16. The conveyor according to claim 12, wherein the conveying face is provided adjacent a center of a body part at least at the location of an area located under the interspace, with a recess, which recess preferably continues as a free space surrounded by the wall parts and/or a common base.

17. The conveyor according to claim 12, wherein said overlapping wall parts are integrally formed with a common carrier.

18. The conveyor according to claim 17, wherein the wall parts are connected to the carrier via a common base.

19. The conveyor according to claim 17, wherein the common carrier is provided with one or more hinge loops.

20. The conveyor according to claim 17, wherein the common carrier forms part of a module.

21. The conveyor according to claim 12, wherein at least a number of modules are provided with at least two wall parts.

22. A side guard element for a conveyor mat including a common carrier with a conveying face, said side guard element comprising:
at least two upstanding wall parts forming part of a series of wall parts, said at least two wall parts overlapping at least partly at a top side of said at least two wall parts thereby including a slot-shaped interspace corresponding to a thickness of at least a top side of a wall part of said series of wall parts, wherein one or more other wall parts of said series of wall parts can at least partly be accommodated in the slot-shaped interspace.

23. The side guard element according to claim 22, wherein the wall parts have a common base.

24. The side guard element according to claim 22, wherein the common carrier is provided with one or more hinge loops.

25. The side guard element according to claim 24, wherein the common carrier forms part of a module for a modular conveyor mat, comprising a body part provided at front and rear sides extending transversely to the conveying direction with rows of hinge loops spaced apart at mutual interspaces transversely to the conveyor direction with hinge holes extending transversely to the conveying direction so that front sides and rear sides of successive modules are couplable through engagement of the hinge loops with the aid of a hinge pin extending transversely to the conveying direction, so that top faces of the coupled modules form a conveying face.

26. The side guard element according to claim 25, wherein in conveying direction said interspace has the largest slot-width adjacent a center of the body part.

27. The side guard element according to claim 25, wherein in conveying direction a side surface is located adjacent a center of the body part.

28. The side guard element according to claim 25, wherein the conveying face is provided in conveying direction adjacent a center of a body part at least at the location of an area located under the interspace, with a recess, which recess preferably continues as a free space surrounded by the wall parts and/or a common base.

29. The side guard element according to claim 25, wherein said overlapping wall parts are arranged with different orientation and/or position with respect to a side edge of the module.

30. A conveyor comprising:
a conveying face;
a side guard including a series of wall parts extending in a conveying direction and upstanding substantially transversely to the conveying face,
wherein at least two wall parts of said series of wall parts at least partly overlap in the conveying direction at a top side of said at least two wall parts remote from the conveying face, said at least two wall parts being arranged to include an intermediate distance between said top side of said at least two wall parts, said intermediate distance corresponding to a thickness of at least one top side of a wall part of said series of wall parts, and proceed, at least adjacent an end, with at least one side face of said at least two wall parts substantially parallel to a side edge of the conveyor, wherein one or more other wall parts of said series of wall parts can at least partly be accommodated in the intermediate distance.

* * * * *

UNITED STATES PATENT AND TRADEMARK OFFICE
CERTIFICATE OF CORRECTION

PATENT NO.        : 8,371,436 B2
APPLICATION NO.   : 12/863783
DATED             : February 12, 2013
INVENTOR(S)       : Cornelissen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 289 days.

Signed and Sealed this
First Day of September, 2015

Michelle K. Lee
*Director of the United States Patent and Trademark Office*